(12) United States Patent
Codilian et al.

(10) Patent No.: US 6,788,480 B1
(45) Date of Patent: Sep. 7, 2004

(54) METHOD AND APPARATUS FOR DETERMINING TRACK DENSITY DURING A SERVO-TRACK WRITING OPERATION

(75) Inventors: Raffi Codilian, Irvine, CA (US); William D. Johns, Dana Point, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 127 days.

(21) Appl. No.: 10/028,329

(22) Filed: Dec. 22, 2001

(51) Int. Cl.[7] .................... G11B 5/02; G11B 27/36; G11B 5/09
(52) U.S. Cl. .................... 360/25; 360/31; 360/53
(58) Field of Search .................... 360/31, 75, 51, 360/53, 25

(56) References Cited

U.S. PATENT DOCUMENTS

| | | | | |
|---|---|---|---|---|
| 4,455,583 A | * | 6/1984 | Schultz | 360/78.05 |
| 6,002,541 A | * | 12/1999 | Belser et al. | 360/77.08 |
| 6,101,065 A | | 8/2000 | Alfred et al. | |
| 6,118,614 A | * | 9/2000 | Lee | 360/75 |
| 6,178,058 B1 | * | 1/2001 | Pan et al. | 360/60 |
| 6,344,942 B1 | * | 2/2002 | Yarmchuk | 360/75 |
| 6,597,528 B1 | * | 7/2003 | Pang et al. | 360/78.04 |
| 2002/0036849 A1 | * | 3/2002 | Quak et al. | 360/31 |

* cited by examiner

*Primary Examiner*—David Hudspeth
*Assistant Examiner*—Glenda Rodriguez
(74) *Attorney, Agent, or Firm*—Milad G. Shara, Esq.; Knobbe Martens Olson & Bear

(57) ABSTRACT

Disk drives are produced having a track density that is determined during a servo-track writing operation. A plurality of calibration tracks is written onto a storage medium of a disk of a head-disk assembly at a calibration track density. The calibration track density corresponds to a portion of a nominal track density profile. An aspect of the servo performance of the head-disk assembly is measured at the calibration tracks. A selected track density profile is identified based on the measured servo performance. The plurality of tracks is written to storage medium at the selected track density profile.

34 Claims, 10 Drawing Sheets

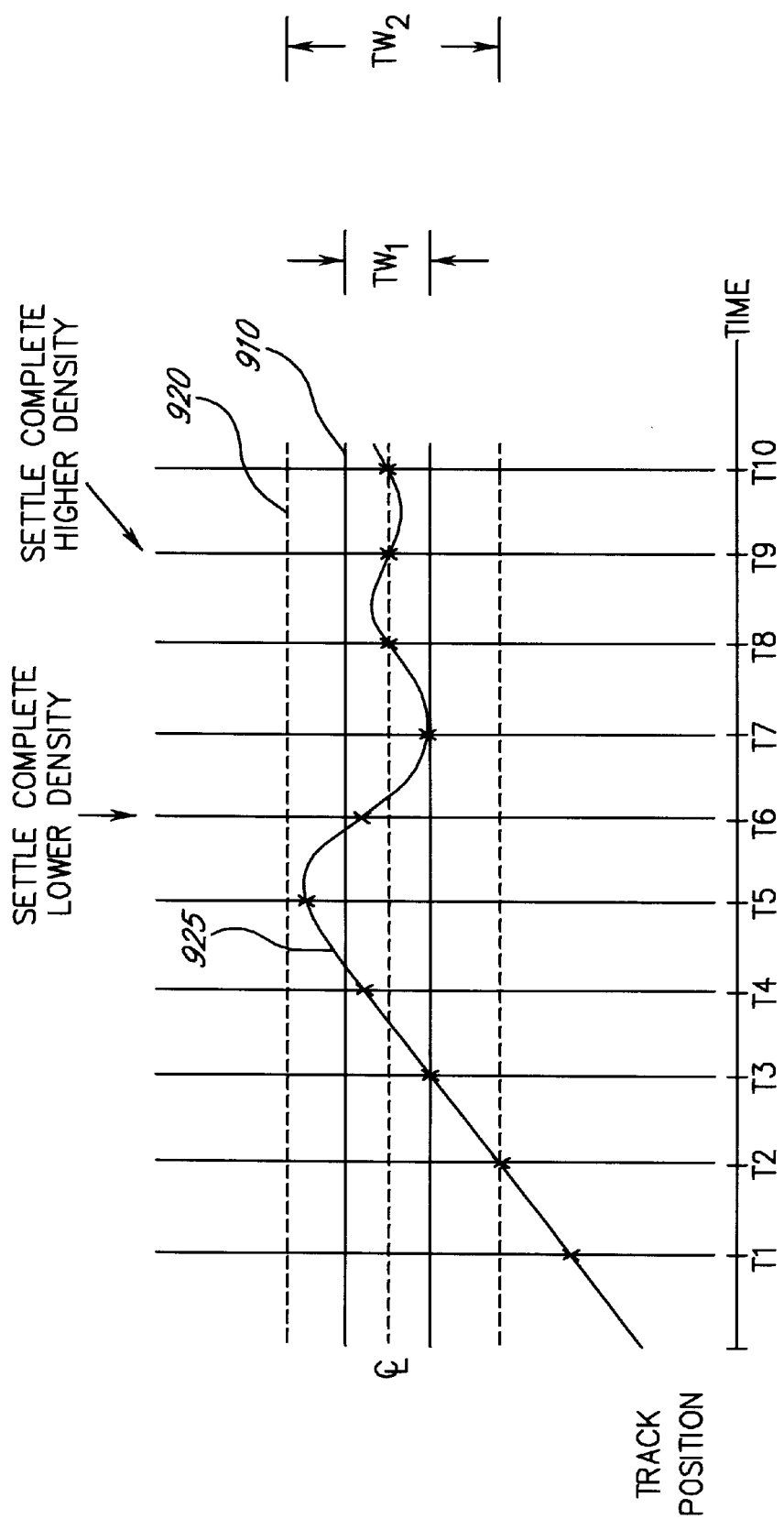

METHOD AND APPARATUS FOR DETERMINING TRACK DENSITY DURING A SERVO-TRACK WRITING OPERATION

BACKGROUND OF THE INVENTION

1. Field of the Invention

The present invention relates to an apparatus and method for determining the density of servo-tracks to be written to a disk drive during a servo-track writing operation.

2. Description of the Related Art

Disk drives permanently store information in the form of magnetic transitions written onto and read from one or more rigid disks. These transitions are written by a write element in generally concentric tracks on a storage medium that is formed on the disks. A servo system is provided in the disk drive that includes a plurality of servo sectors on the disks to enable a read element to access a particular track (i.e., to seek) and to remain on the track (i.e., to track-follow). One way to quantify the performance of a disk drive's servo system is to measure its position error signal ("PES"), which indicates how much the read/write head strays from the centerline of the track. Servo information is written into servo sectors in a manufacturing process called servo-track writing.

Servo-track writing is performed by a device called a servo-track writer, into which a disk drive sub-assembly, called a head-disk assembly (HDA), is inserted. The HDA comprises a spindle motor, one or more disks rotatably mounted on the spindle motor, a head actuator, at least one read element, and at least one write element mounted on the head actuator for each disk. The servo-track writing process establishes the density of the tracks along a radius of the disk, known as the track density. Although the track density of a disk drive varies across the surface of a disk, track density is typically summarized as a single value of tracks per inch ("TPI"). Track density directly affects the capacity of the disk drive.

The track density is predetermined for a particular disk drive design to assure that HDAs made according to that disk drive design will have adequate track-following performance. However, because PES varies across the distribution of HDAs, some HDAs have much better PES than needed for the predetermined track density. These HDAs have PES margin that is currently not utilized.

SUMMARY OF THE INVENTION

One aspect of the present invention is a method for manufacturing a disk drive that comprises a head-disk assembly that has a disk with a storage medium. The head-disk assembly has a servo performance. A plurality of calibration tracks are written onto the storage medium at a calibration track density profile corresponding to a portion of a nominal track density profile. The servo performance of the head-disk assembly is measured at the calibration tracks. A selected track density profile is identified based on the measured servo performance of the head-disk assembly. A plurality of tracks are written to the storage medium of the disk at the selected track density profile.

Another aspect of the present invention is a servo-track writer that writes a plurality of calibration tracks on a storage medium of a head-disk assembly at a calibration stepping increment. The servo-track writer also writes a plurality of servo-tracks on the storage medium of the head-disk assembly at a selected stepping increment. The head-disk assembly comprises a read element, a write element, and an actuator. The head-disk assembly has a servo performance. The servo-track writer comprises a controller that processes a clock reference pattern to determine the circumferential location of the write element. The controller also directs the write element to write the servo-tracks to the storage medium. The servo-track writer also comprises a head positioner circuit and a servo performance measurement circuit. The servo performance measurement circuit measures an aspect of the servo performance of the head-disk assembly and identifies a selected stepping increment based thereon. The head positioner circuit comprises a positioning mechanism that imparts a step-wise movement to the actuator at a calibration stepping increment for writing the plurality of calibration tracks. The positioning mechanism imparts a step-wise movement to the actuator at the selected stepping increment for writing the plurality of servo-tracks to the storage medium.

Another aspect of the present invention is a disk drive that comprises a head-disk assembly that has a servo performance. The head disk assembly comprises an actuator, a read element, a write element, a spindle motor, and a disk that has a storage medium. The disk is mounted on the spindle motor. A plurality of calibration tracks are written onto the storage medium at a calibration track density corresponding to a portion of a nominal track density profile. The servo performance of the head-disk assembly is measured at the calibration tracks. A selected track density profile is identified based on the measured servo performance of the head-disk assembly. A plurality of servo-tracks are written to storage medium of the disk at the selected track density profile.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention.

FIG. 4 also shows a curve of track density (TPI) that corresponds to the PES curve of FIG. 4. The track density scale is shown on the left y-axis.

FIG. 9 shows the relationship between track density and settle performance.

DETAILED DESCRIPTION OF THE PREFERRED EMBODIMENT

Figure 1:
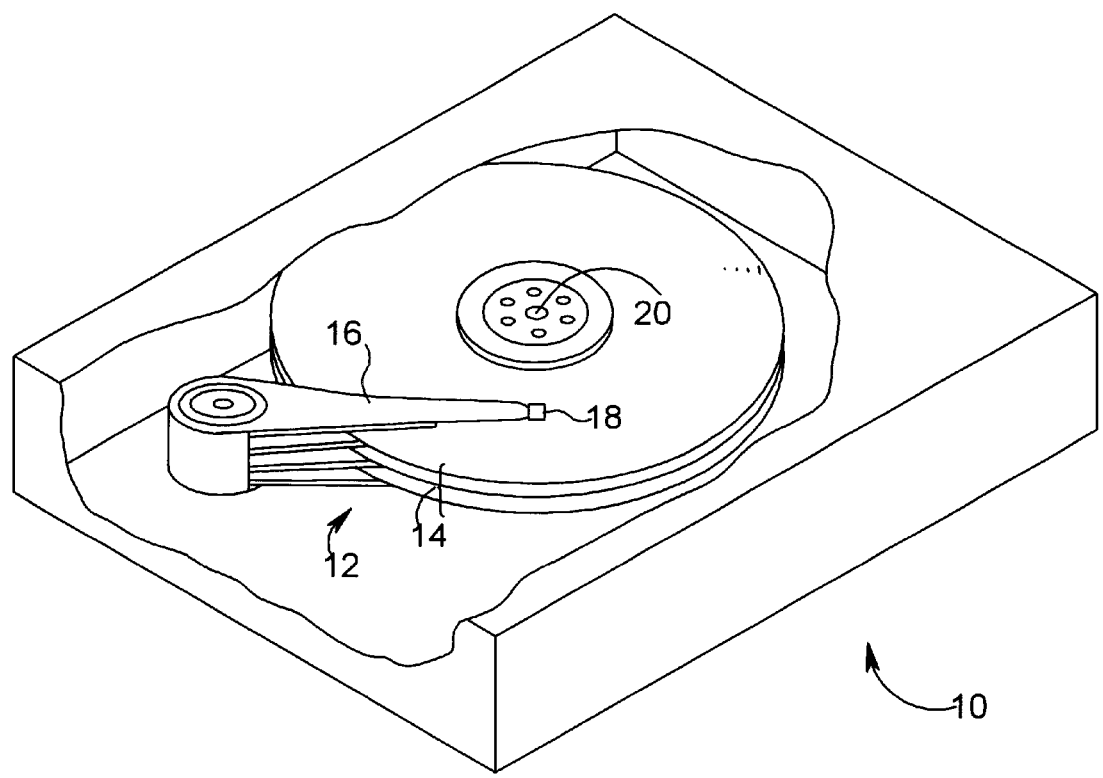
FIG. 1 is a pictorial representation of a disk drive comprising an HDA.

FIG. 1 shows a disk drive 10 that comprises a head-disk assembly (HDA) 12 that includes at least one rigid disk 14. The disk 14 has at least one recording surface with a storage medium deposited thereon. The HDA 12 also comprises an actuator 16, at least one read/write head 18 mounted on the actuator 16, and a spindle motor 20. In the preferred embodiment, the read/write head 18 comprises a read element and a write element. In this embodiment, the read element and the write element are integrated into a single structure, i.e., the read/write head 18. In another embodiment, one structure is provided for the read element and a different structure is provided for the write element. This embodiment may be used in an optical drive.

In the preferred embodiment, the actuator 16 is a rotary actuator that positions the read element and the write element of the read/write head 18. In another embodiment, the actuator 16 can be a linear actuator that positions the read element and the write element of the read/write head 18. The disk 14 is mounted on the spindle motor 20. The disk drive 10 preferably also includes a voice-coil motor (VCM) 222, shown schematically in FIG. 2, that positions the actuator 16 and the read/write head 18, including the read and write elements.

The disk 14 also comprises a plurality of servo-tracks that include embedded servo sectors which are recorded at a regular interval and interleaved with the data sectors. Once written, the servo-tracks establish the density of the tracks along a radius of the disk 14, i.e., the track density of the disk 14. As discussed above, the density of the tracks is typically summarized as a single value measured in tracks per inch (TPI). However, the track density typically varies across the disk, and, therefore, the disk drive 10 more generally has a track density profile, as discussed in more detail below in connection with FIG. 4. The operation of a disk drive 10 incorporating embedded servo sectors to enable the seeking and tracking operations necessary to write and read data to the data sectors will be discussed in more detail below in connection with FIG. 5.

Figure 2:
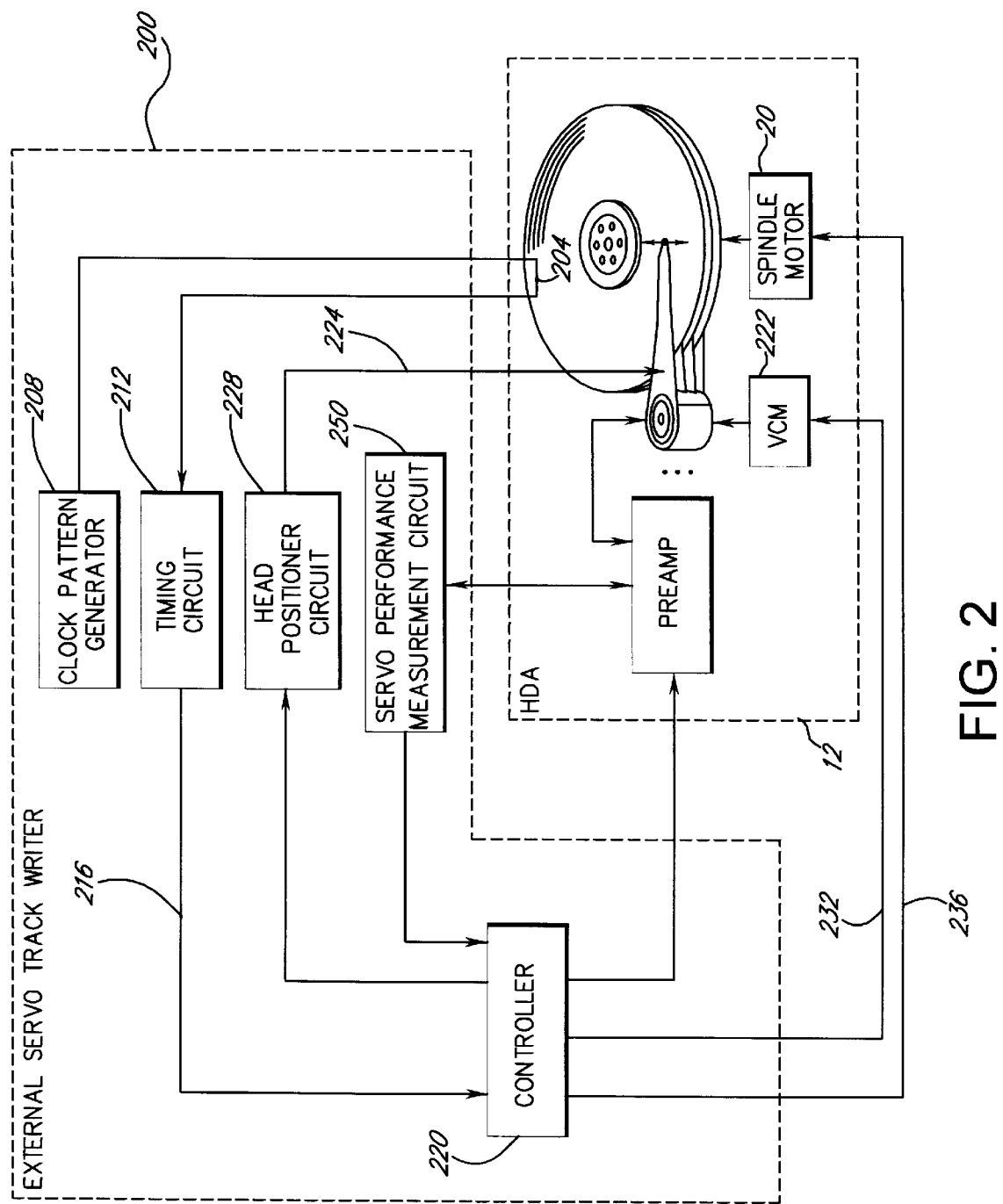
FIG. 2 pictorially illustrates the HDA of the disk drive of FIG. 1 inserted into an external servo-track writer that writes servo-tracks according to the method described herein.

The servo-tracks can be written to the disk 14 of the HDA 12 by an external servo-track writer 200, illustrated in FIG. 2. In one embodiment, the servo-track writer 200 can use the preamplifier, the read element, and the write element of the read/write head 18 within the HDA 12, but can use separate control circuitry and servo mechanics to radially position the read/write head 18, as is discussed below. In another embodiment, as discussed above, the read element and the write element of the read/write head 18 are incorporated into separate structures.

In one embodiment, the external servo-track writer 200 comprises a "clock head" 204, a clock pattern generator 208, a timing circuit 212, and a timing clock 216. The servo-track writer 200 directs the clock head 204 and the clock reference pattern generator 208 to write a magnetic clock reference pattern to the storage medium the disk 14. The magnetic clock reference pattern is read from the storage medium of the disk 14 by the clock head 204 and is processed by the timing circuit 212 to generate the timing clock 216 during the servo-writing of the HDA 12. The servo-track writer 200 also comprises a controller 220, to which the timing clock 216 is applied. The controller 220 processes the timing clock 216 to derive the circumferential location of the read/write head 18 with respect to the servo-tracks so that the servo sectors are written at the same circumferential location from the inner to the outer diameter servo-tracks. The controller 220 also directs the read/write head 18 to write the servo-tracks to the storage medium of the disk 14.

In another embodiment, the clock reference pattern is not read by the clock head 204 from the disk 14, but is provided to the controller 220 from a clock circuit that is external to the HDA 12. In this embodiment, as will be recognized by one skilled in the art, the servo-track writer 200 need not have all the circuitry and components shown in FIG. 2. For example, the servo-track writer 200 need not have a clock head 204, and the clock pattern generator 208 and timing circuit 212 can be replaced by the external clock circuit.

Preferably, the external servo-track writer 200 further comprises a push pin 224 and a head positioner circuit 228. The push pin 224 is extendable into the HDA 12 to engage the actuator arm 16. The head positioner circuit 228, discussed in more detail below, comprises a laser interferometer, or other suitable positioning mechanism, and increments the push pin 224 by a value to impart a step-wise movement to the actuator 16. Conventionally, the head positioner circuit 228 increments the push pin 224 by a constant value, and more particularly by a value that is constant for all disk drives 10 of a given disk drive design.

In addition to performing the functions outlined above, the controller 220 also controls several operations of the HDA 12 during the servo-track writing operation. For example, the controller 220 applies a reverse direction bias current to the coil of the VCM 222 over a line 232 in order to bias the actuator arm 16 against the push pin 224 to facilitate precise positioning of the read element and the write element of the read/write head 18. The controller 220 also applies a current to the coil of the spindle motor 20 over a line 236 in order to spin up the disk 14 and then rotate the disk 14 at a substantially constant angular velocity.

The servo-track writer 200 also can comprise a servo performance measurement circuit 250 in the embodiment shown. As will be discussed in more detail below, the applicants have discovered that by incorporating the servo performance measurement circuit 250 into the servo-track writer 200, different increment values can be identified for different disk drives 10 of a given disk drive design. In one embodiment, a different increment can be identified for every disk drive 10 servo written by the servo-track writer 200. Therefore, a selected track density profile can be identified based on one or more measurements made by the servo performance measurement circuit 250, and the selected track density profile can vary within the population of disk drives 10 made according to a single disk drive design.

The servo performance measurement circuit 250 preferably measures at least one aspect of the servo performance of the HDA 12 and preferably identifies a selected stepping increment, or a selected stepping increment profile based thereon. As used herein, "stepping increment" means a discrete movement of the actuator 16 by servo track writer 200 between servo track writing passes, which movement determines the track density. As such, the discrete movement may be implemented as a single step or as a series of steps comprising the required movement. A "stepping increment profile" as used herein means a pattern of such discrete movements applied across the disk surface. Such a pattern can comprise a linear progression of discrete movement or a non-linear progression.

Many different aspects of servo performance can be measured by the servo performance measurement circuit

Figure 3:
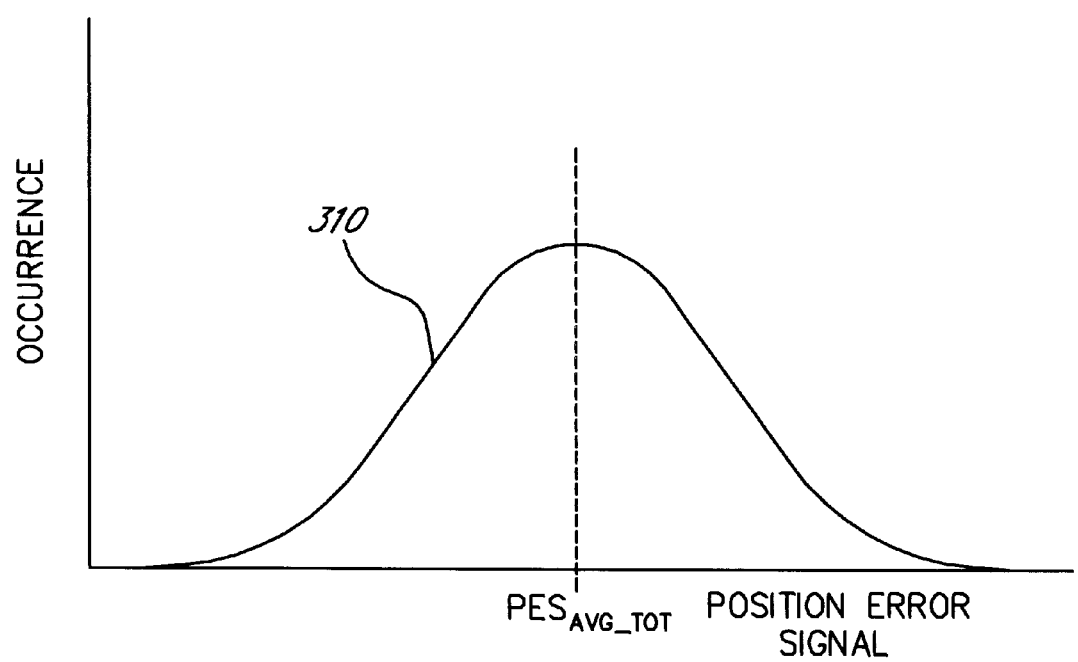
FIG. 3 shows an example of a distribution of PES of a population of HDAs.
Figure 4:
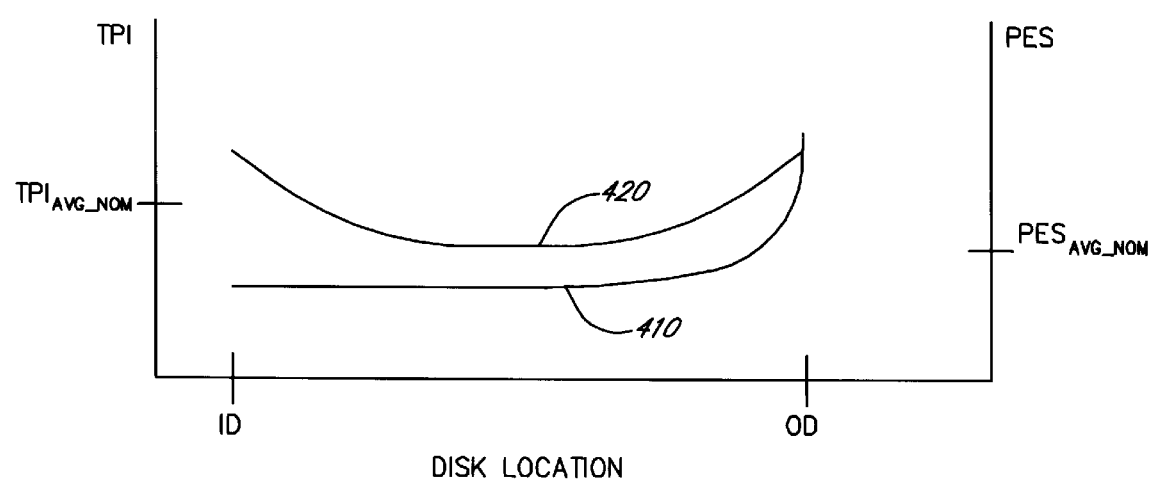
FIG. 4 shows the PES of an individual HDA as a function of the disk location, where the HDA has an average PES equal to the average PES shown in FIG. 3. The PES values are shown on the right y-axis.
Figure 5:
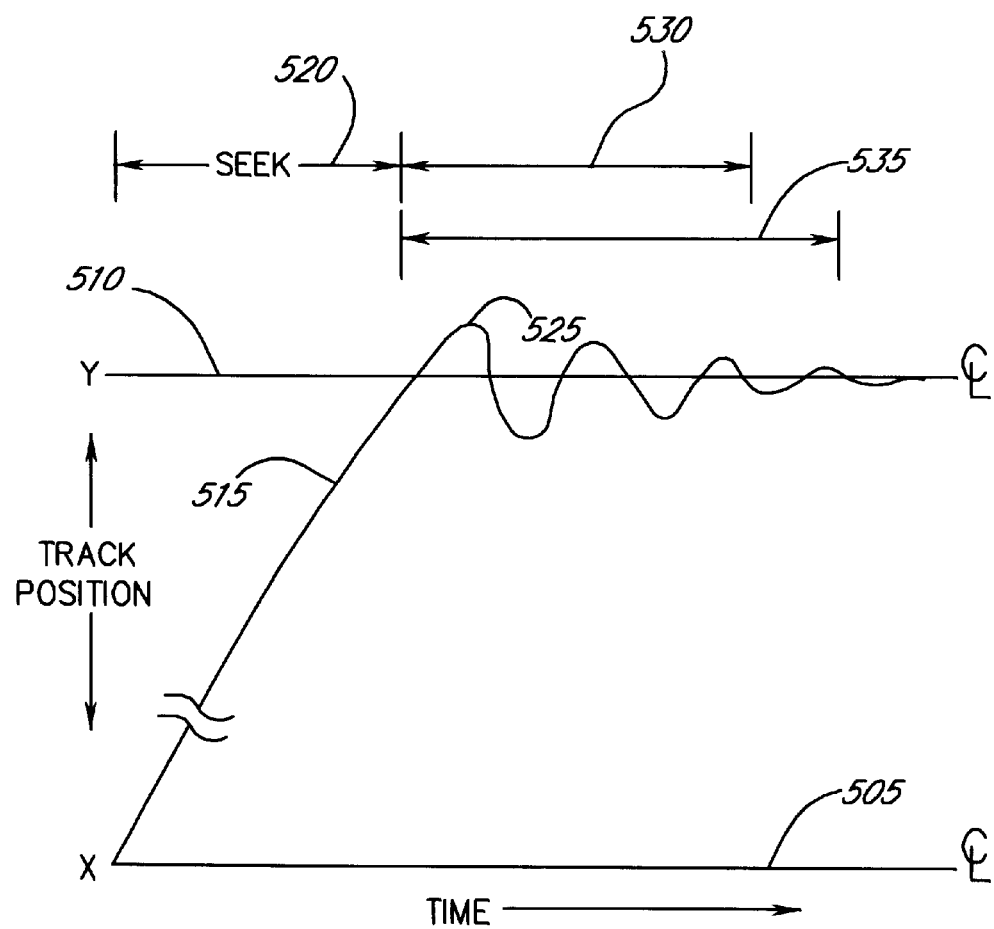
FIG. 5 shows a seek profile, and particularly shows a settle profile and a settle window for a high seek performance HDA and a nominal performance HDA.

250. For example, PES, as illustrated in FIGS. 3–4, can be measured by the servo performance measurement circuit 250. In another embodiment, an aspect of seek performance, such as settle time, as illustrated in FIG. 5, can be measured by the servo performance measurement circuit 250. In yet another embodiment, the servo performance measurement circuit 250 can measure two or more aspects of servo performance, such as PES and settle time. Other aspects of servo performance known in the art and can also be measured by the servo performance measurement circuit 250 and used in the methods described herein.

In one embodiment, the servo performance measurement circuit 250 is configured to identify a selected track density profile based on measured servo performance of the HDA 12. The positioning mechanism of the head positioner circuit 228 moves the push pin 224 to impart a step-wise movement to the actuator 16. In one embodiment, the positioning mechanism of the head positioner circuit 228 is configured to move the actuator 16 by a calibration stepping increment to write the plurality of calibration tracks onto the storage medium of the disk 14. Thus the servo-track writer 200 can write a plurality of calibration tracks onto the storage medium of the disk 14 at a calibration track density profile.

As discussed in more detail below in connection with FIGS. 6 and 8, the calibration track density profile corresponds to a portion of a nominal track density profile in one embodiment. The nominal track density profile can be the track density profile expected to work in the HDA 12 that has average PES (shown on FIG. 3 as $PES_{AVG\_TOT}$, and discussed further below). The servo performance measurement circuit 250 is configured to measure the servo performance of the HDA 12 at the calibration tracks and identify a selected track density profile based on the measured servo performance of the HDA 12 at the calibration tracks.

The head positioner circuit 228 is configured to move the push pin 224 to impart a step-wise movement to the actuator 16 at the selected stepping increment. Thus, the plurality of servo-tracks is written to the storage medium of the disk 14 according to the selected stepping increment. As will be discussed in greater detail below in connection with FIG. 4, the selected stepping increment is related to the selected track density. As discussed above, the selected stepping increment can be a selected stepping increment profile, i.e., the stepping increment can be a non-constant value, and thus the methods disclosed herein are capable of producing a wide variety of track density profiles.

As discussed above, the PES of the HDA 12 is one aspect of servo performance that can be measured by the servo performance measurement circuit 250. PES is affected by many factors, and generally indicates the tendency of the read element or the write element of the read/write head 18 to remain over a given track on the storage medium of the disk 14. Higher PES indicates that the HDA 12 has less margin for writing data. Lower PES indicates that the HDA 12 has more margin for writing data. FIG. 3 shows an example of a distribution 310 of the average PES for a population of HDAs 12. The PES values of the distribution 310 correspond to the average PES for all servo-tracks in individual HDAs 12. PES of an HDA 12 of a disk drive 10 is a random variable and the distribution 310 is a normal distribution. $PES_{AVG\_TOT}$ is the average value of the PES for the entire population of disk drives 10 made according to a given disk drive design.

Although an average PES value can be calculated, PES varies across the disk 14 of an individual disk drive 10, as shown in FIG. 4. As may be seen, a PES curve 410 for an individual disk drive 10 is a function of location over the disk 14. As shown, the PES at the OD position, i.e., proximate the outer circumference of the disk 14, is greater than the PES at the ID position, i.e., proximate the inner circumference of the disk 14. The PES at the OD and the PES at the ID are both greater than the PES in the middle portion of the disk 14. The OD of the disk 14 also generally has larger PES than near the middle of the disk 14 due to adverse mechanical conditions at that position. Higher PES indicates that the HDA 12 has less margin for writing data. As indicated on the right-hand y-axis in FIG. 4, an average PES value, $PES_{AVG\_NOM}$, can be calculated for an individual disk drive 10. The applicants have determined that when a statistical measure of the PES, such as $PES_{AVG\_NOM}$, of a particular HDA 12 is lower than the nominal PES ($PES_{AVG\_TOT}$) shown in FIG. 3, the track density may be increased for that HDA 12.

FIG. 4 also illustrates a track density profile 420 for an HDA 12 having a rotary actuator 16. The profile 420, commonly referred to as a "bathtub" curve, is a plot of the track density value on the left y-axis and disk location on the x-axis. The track density profile 420 generally has the shape of a cross-section of a bathtub. The track density near the inner circumference of the storage medium (marked "ID") is represented toward the left of the track density profile 420. The track density value is relatively high because the read/write head 18 is at a relatively high skew angle at the ID, as will be understood. The track density near the outer circumference of the storage medium of the disk 14 (marked "OD") is represented toward the right of the track density curve. The track density there again is relatively high because the read/write head 18 is at relatively high skew angle at the OD. The track density value decreases between the "ID" position and the "OD" position because the skew angle of the read/write head 18 decreases between those positions. As discussed above, one way to summarize the track density profile 420 is to compute an average track density. The average track density of the track density profile 420 is $TPI_{AVG\_NOM}$, shown on the left y-axis. Although the track density profile plotted in FIG. 4 is that of an HDA 12 having a rotary actuator 16, a similar plot can be made showing the density of tracks along a radius of the disk 14 for an HDA 12 having a linear actuator 16.

Another aspect of servo performance that can be measured by the servo performance measurement circuit 250 is the seek performance of the HDA 12. In one embodiment, the settle time of the HDA 12 is measured by the servo performance measurement circuit 250. FIG. 5 illustrates a representative seek profile in a disk drive 10. The seek operations are read and write seek operations from a current track X 505 to a target track Y 510, and as such, follow a seek profile for a given seek distance. The graphical representation illustrates the position of the head relative to target track Y 510 versus time. A position plot of the seek profile is illustrated at 515 with a corresponding seek time (time to reach the target track) indicated at 520.

During the seek 515, as the head approaches target track Y 510, the actuator contains an amount of energy and has transients due to excitation of mechanical resonance, and as such, "over shoots" the target track Y 510, indicated at 525, until the servo system brings the read/write head 18 into closer alignment with the target track Y 510. The overshoot prevents the disk drive 10 from performing read or write operations until the read/write head 18 settles onto the target track Y 510, i.e., until a settle criteria is satisfied. The time required to reach the settle criteria is known as the settle time.

As with PES, the settle performance of a population of disk drives 10 is a random variable. As such, the seek performance and settle performance of some disk drives 10 are better than such performance of other disk drives 10. As a result, the settle time for the HDA 12 with better settle performance, i.e., the high performance HDA 12, will be shorter, as indicated by the high performance settle time 530. On the other hand, an HDA 12 with nominal performance will have a longer settle time, as indicated by the settle time 535.

Figure 6:
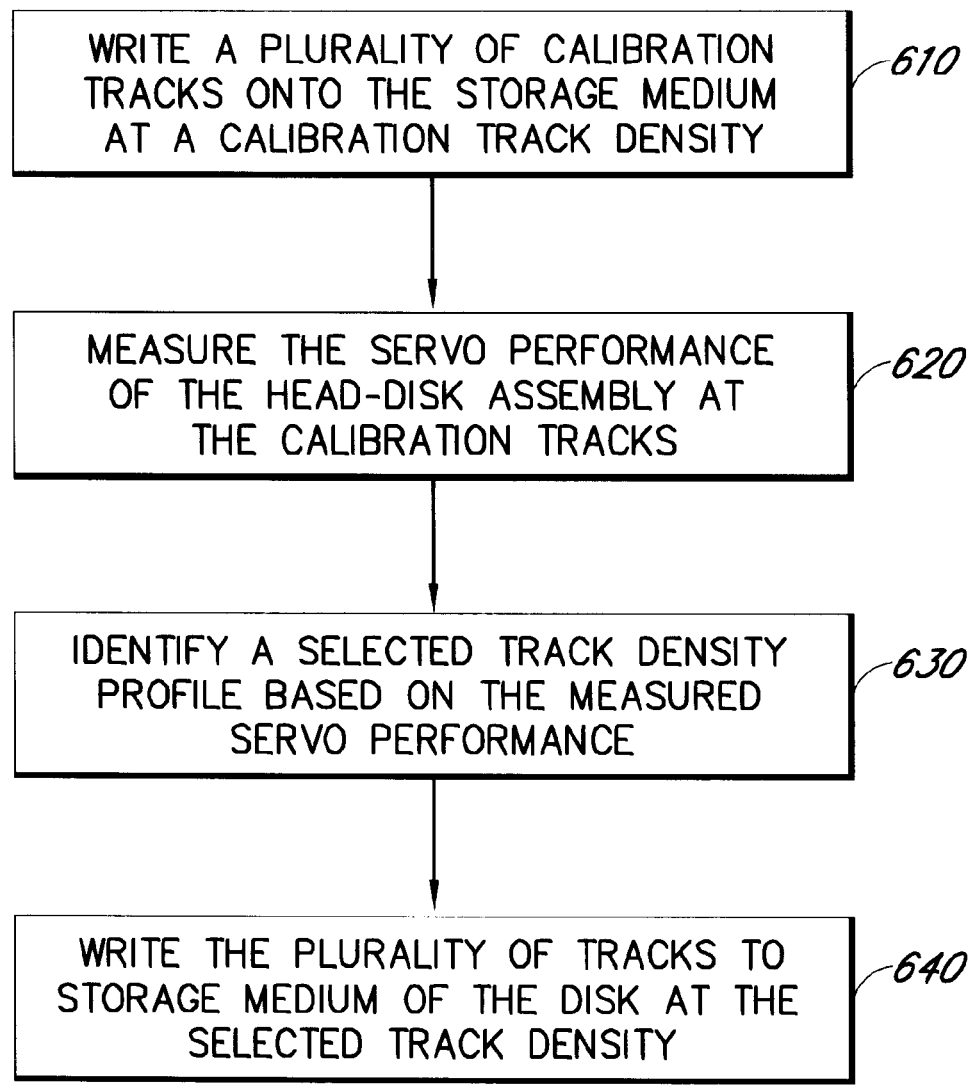
FIG. 6 shows a flow chart of a method for determining the track density of an individual HDA during a servo-track writing operation.

In one embodiment, as shown in FIG. 6, a method is provided for manufacturing the disk drive 10 that comprises the HDA 12 that comprises the disk 14 with a storage medium. In a step 610, the plurality of calibration tracks is written onto the storage medium of the disk 14 at a calibration track density profile. In one embodiment, the calibration tracks are written so that the density of the calibration tracks corresponds to a portion of a nominal track density profile. As discussed above, the nominal track density profile may be the track density profile that will work for the HDA 12 having nominal PES, i.e., $PES_{AVG\_TOT}$ (see FIG. 3).

In a step 620, the servo performance of the HDA 12 is measured at the calibration tracks. As discussed above, measuring the servo performance can include any of the following alone or in combination:

measuring the PES performance of HDA 12
at the calibration tracks;
measuring the seek performance of the HDA 12;
measuring settle performance of the HDA 12 measuring settle
time of the HDA 12; or
measuring any other aspect of servo performance alone or in
combination with one or more of the foregoing.

Then in a step 630, a selected track density profile is identified based on the measured servo performance of the HDA 12. As discussed above, the selected track density profile can have the same shape as the nominal track density profile, illustrated in FIG. 3, but be generally higher or lower. This is further illustrated and discussed below in connection with FIG. 7. If the servo performance is relatively good, the average track density of the selected track density profile can be greater than the average track density of the nominal track density profile. If the servo performance is relatively poor, the average track density of the selected track density profile can be less than the average track density of the nominal track density profile. If the servo performance is about equal to the nominal servo performance, the average track density of the selected track density profile can be about equal to the average track density of the nominal track density profile.

In another embodiment, the selected track density profile is identified by comparing the average PES of the HDA 12 at the calibration tracks to the expected PES of the nominal track HDA 12. In one embodiment where the measured average PES of the HDA 12 at the calibration tracks is lower that the expected PES of the nominal track density profile of a nominal HDA 12, the average track density of the selected track density profile can be greater than the average track density of the nominal track density profile. In the embodiment where the measured average PES of the HDA 12 at the calibration tracks is higher that the expected PES of the nominal track density profile of a nominal HDA 12, the average track density of the selected track density profile can be less than the average track density of the nominal track density profile.

In a step 640, a plurality of tracks is written to storage medium of the disk 14 at the selected track density profile. The writing of the servo track onto the storage medium of the disk 14 is discussed in detail above and will not be repeated here.

Figure 7:
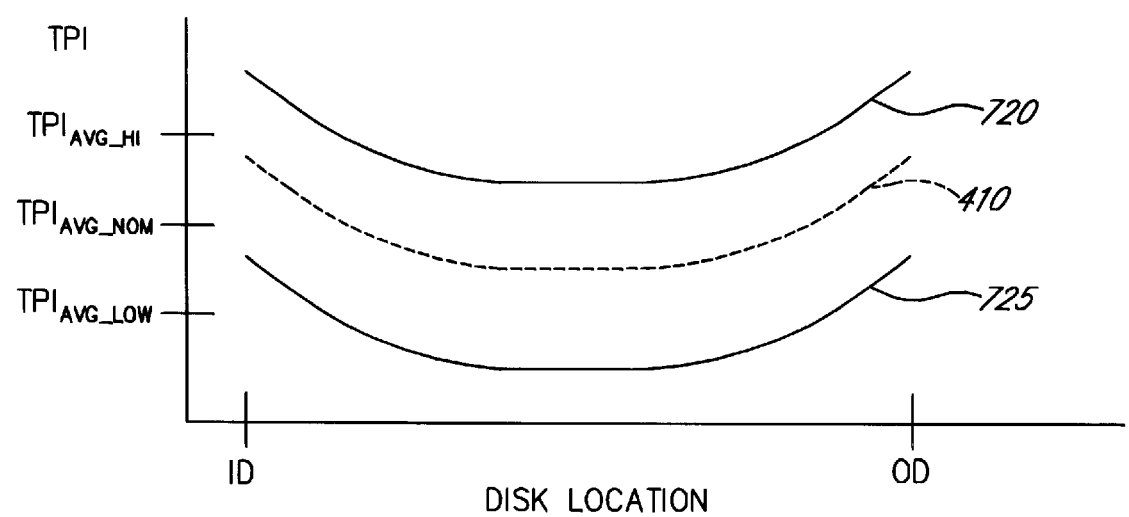
FIG. 7 shows the track density profiles of various HDAs written according to the method of FIG. 6.

FIG. 7 illustrates some of the track density profiles that can be selected by the apparatus and methods described herein. The track density profile 420 is the nominal track density profile, also shown in FIG. 4. The track density profile 420 can be summarized by the single value $TPI_{AVG\_NOM}$, shown on the y-axis of FIG. 7. A track density profile 720 is also shown that is generally above the track density profile 420, and thus has a higher average track density value, $TPI_{AVG\_HI}$. In one embodiment of the methods disclosed herein, the track density profile 720 can be identified as the selected track density profile if, for example, the servo performance of the HDA 12 to which it corresponds is relatively high. A track density profile 725 is also shown that is generally below the track density profile 420, and thus has a lower average track density value, $TPI_{AVG\_LOW}$. In another embodiment of the methods disclosed herein, the track density profile 725 can be identified as the selected track density profile if, for example, the servo performance of the HDA 12 to which it corresponds is relatively low.

Figure 7A:
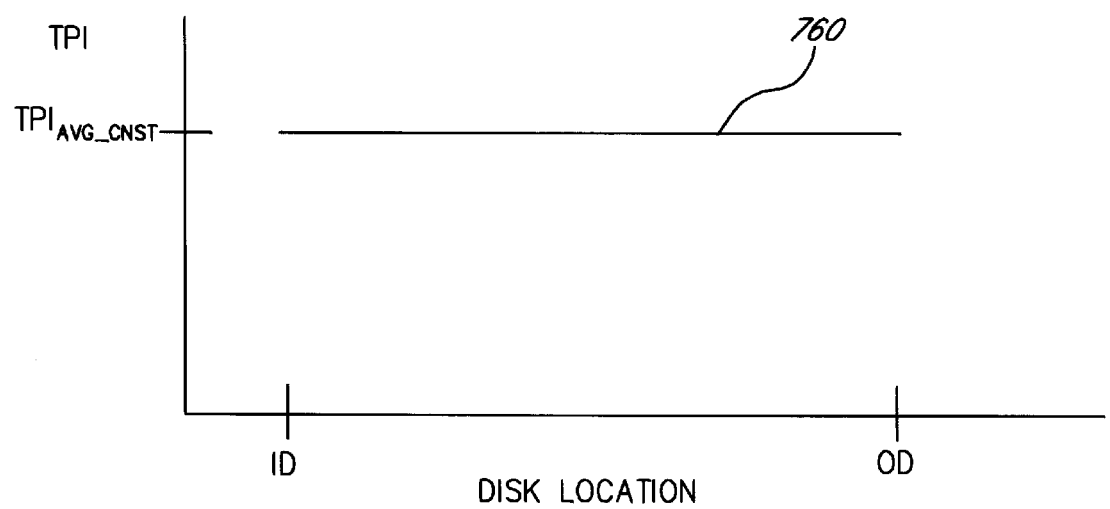
FIG. 7A shows a track density profile of an HDA written according to a method described herein.

As discussed above, the method and apparatus described herein are capable of producing other shaped track density profiles by varying the stepping increment of the push pin 224 across the stroke of the actuator 16. In this manner, a wide variety of track density profiles can be achieved. For example, the track density can be made constant across the disk from ID to OD, as illustrated by the track density profile 760 in FIG. 7A. This can be achieved by varying the amount that the push pin 224 is incremented as the write element of the read/write head 18 is moved across the disk 14. In another variation, the track density can be made to actually decrease at the OD, while being generally higher than $TPI_{AVG\_NOM}$ at other locations on the disk.

In another embodiment, a method is provided that contemplates sacrificing some of the track density capability of the HDA 12 to increase the HDA's seek performance. This embodiment is illustrated by FIG. 8. In a step 810, a plurality of calibration tracks is written in the manner discussed above. Then, in a step 820, the servo performance of the HDA 12 is measured at the calibration tracks. This step preferably involves measuring the track-following capability and the seek performance of the HDA 12. In one variation, the track-following performance is quantified by measuring the PES of the HDA 12 at the calibration tracks and the seek performance is quantified by measuring the settle time of the HDA 12 at the calibration tracks.

Then in steps 830–860, a selected track density profile is identified based on the step of measuring the servo performance of the HDA 12 at the calibration tracks. In a step 830, a density-based track density profile is identified based on the measured PES of the HDA 12. In a step 840, it is determined whether the value of the measured PES permits reducing the average density of the density-based track density profile in order to increase the seek performance of the HDA 12. In a step 850, a selected track density profile is identified based on the determination of whether reducing the average density of the density-based track density profile is permitted.

Then in a step 860, the plurality of tracks is written to the storage medium of the disk 14 at the selected track density profile. The process of FIG. 8 can be used to determine whether a disk drive is suitable for a high performance application, for a high density application, or for a high density application that can also be used in a high performance application.

Figure 8:
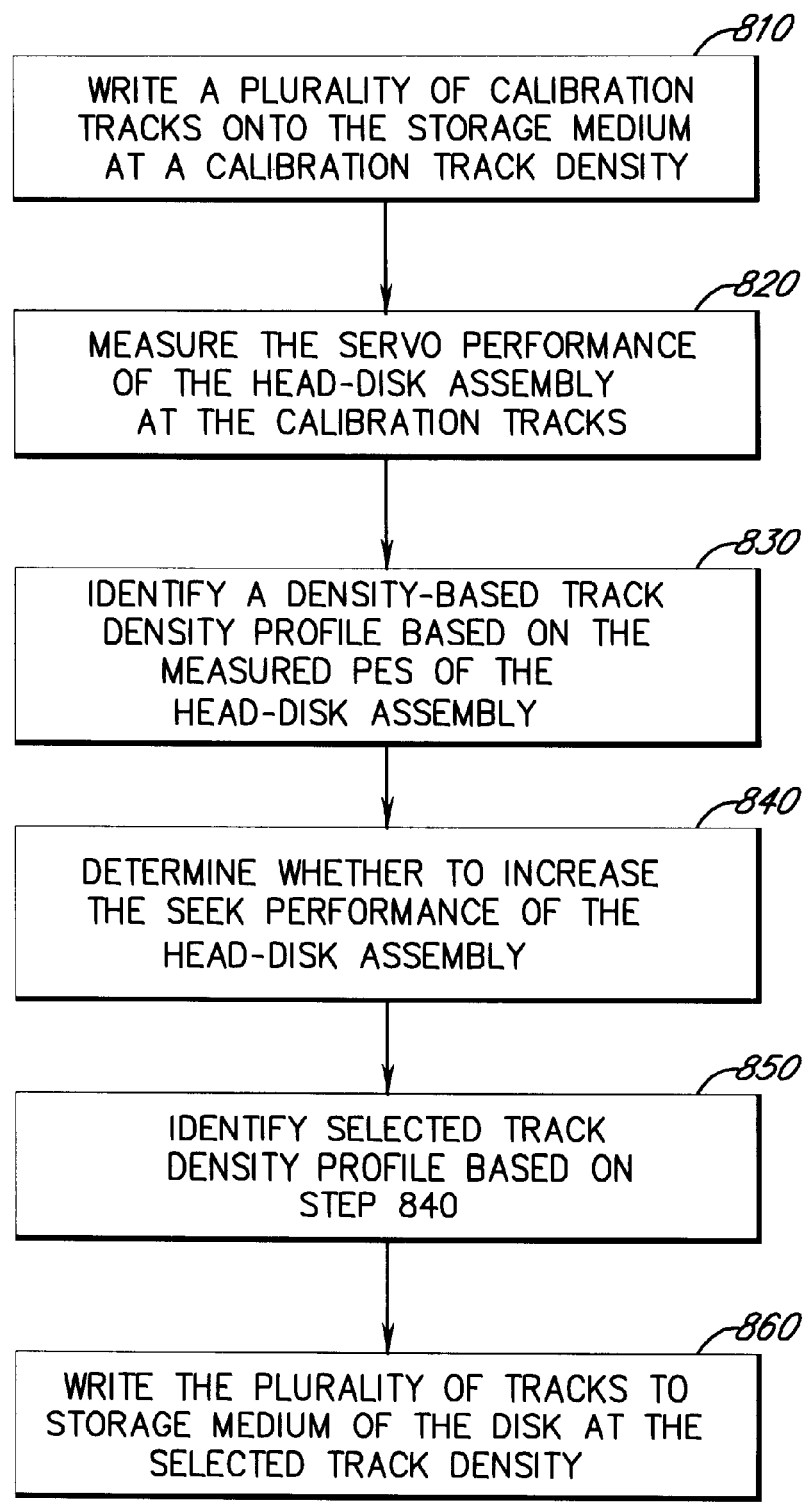
FIG. 8 shows a flow chart of a method for determining a track density during a servo-track writing operation that takes into account whether seek performance can be enhanced.

The method illustrated in FIG. 8 is further illustrated by FIG. 9. A track 910 is shown that corresponds to the density-based track density profile. The width $TW_1$ of the track 910 is a function of the density-based track density profile. Another track 920 is shown in vertical dashed lines that correspond to the selected track density profile, which in this example is lower than the density-based track density profile. As a result, the width $TW_2$ of the track 920, which is a function of the selected track density profile, is larger than the width $TW_1$ of the track 910. FIG. 9 also shows a seek profile 925 of a head 18 seeking the track 910 at time T1. At time T3, the head first arrives at the track 910, the seek time ends, and the settle time begins. As discussed above, the head 18 tends to overshoot the track 910, and the settle time lasts until the head is close enough to the center of the track to function adequately. A head 18 may be considered close enough to the center of the track 910 when the head 18 is within a settle window, i.e., when the head is less than a predetermined percentage of the track width from the track centerline. The settle time extends from the arrival time (T3) until the head is within the settle window for a fixed number of consecutive samples. For the density-based track density profile of FIG. 9, the settle time continues until time T9.

For the selected track density profile, the seek operation is in progress at time T0. At time T2, the head 18 arrives at the target track 920. Because the HDA mechanics are unchanged, the seek profile 905 is about the same for the density-based track density profile and for the selected track density profile. However, a wider range of absolute deviation from track centerline, i.e., a wider settle window, is defined by applying the same percentage of track width discussed above to the wider track. This wider settle window may enable a shorter settle time. FIG. 9 shows that for the selected track density profile, the settle time continues until time T6. FIG. 9 shows that the settle time is shorter for the lower track density corresponding to $TW_2$ than it is for the higher track density corresponding to $TW_1$.

The foregoing methods compare averages of one or more aspects of servo performance and track density. It should be understood that other statistics can be used to summarize the servo performance and varying track density profiles (e.g., the median, the mode, or some other estimate of the center of the track density distribution, settle time, or PES, as well as standard deviation, variance, or any other estimate of the spread of the track density distribution, settle time, or PES).

What is claimed is:

1. A method for manufacturing a disk drive that comprises a head-disk assembly having a disk with a storage medium, the head-disk assembly having a servo performance, the method comprising:
   writing a plurality of calibration tracks onto the storage medium at a calibration track density profile corresponding to a portion of a nominal track density profile;
   measuring the servo performance of the head-disk assembly at the calibration tracks;
   selecting a track density profile based on the measured servo performance of the head-disk assembly; and
   writing a plurality of tracks to the storage medium of the disk at the selected track density profile.

2. The method of claim 1, wherein the average track density of the selected track density profile is greater than the average track density of the nominal track density profile.

3. The method of claim 1, wherein the average track density of the selected track density profile is less than the average track density of the nominal track density profile.

4. The method of claim 1, wherein the average track density of the selected track density profile is about equal to the average track density of the nominal track density profile.

5. The method of claim 1, wherein the median track density of the selected track density profile is greater than the median track density of the nominal track density profile.

6. The method of claim 1, wherein the median track density of the selected track density profile is less than the median track density of the nominal track density profile.

7. The method of claim 1, wherein the median track density of the selected track density profile is about equal to the median track density of the nominal track density profile.

8. The method of claim 1, wherein the step of measuring the servo performance of the head-disk assembly further comprises measuring the position error signal of the head-disk assembly at the calibration tracks.

9. The method of claim 8, wherein the measured position error signal of the head-disk assembly at the calibration tracks is higher than a nominal position error signal of a nominal disk drive, and wherein the selected track density profile has an average track density that is less than the average track density of the nominal track density profile.

10. The method of claim 8, wherein the measured position error signal of the head-disk assembly at the calibration tracks is lower than the position error signal of a nominal disk drive, and wherein the selected track density profile has an average track density that is not less than the average track density of the nominal track density profile.

11. The method of claim 1, wherein the step of measuring the servo performance of the head-disk assembly further comprises measuring the settle time of the head-disk assembly.

12. The method of claim 11, wherein the measured settle time of the head-disk assembly is longer than a nominal settle time of a nominal head-disk assembly, and wherein the selected track density profile has an average track density that is less than the average track density of the nominal track density profile.

13. The method of claim 11, wherein the measured settle time of the head-disk assembly is shorter than the settle time of a nominal head-disk assembly, and wherein the selected track density profile has an average track density that is not less than the average track density of the nominal track density profile.

14. The method of claim 11, wherein the step of measuring the servo performance of the head-disk assembly further comprises measuring the position error signal of the head-disk assembly at the calibration tracks.

15. A method for manufacturing a disk drive that comprises a head-disk assembly having a disk with a storage medium, the head-disk assembly having a servo performance, the method comprising:
   writing a plurality of calibration tracks onto the storage medium at a calibration track density profile corresponding to a portion of a nominal track density profile;
   measuring the position error signal of the head-disk assembly and the settle time of the head-disk assembly at the calibration tracks;
   identifying a density-based track density profile based on the measured position error signal of the head-disk assembly;

determining whether the value of the measured position error signal permits reducing the average density of the density-based track density profile in order to improve the settle time of the head-disk assembly;

selecting a track density profile based on the determining step; and writing a plurality of tracks to the storage medium of the disk at the selected track density profile.

16. The method of claim 15, wherein the measured position error signal of the head-disk assembly is low, the measured seek performance of head-disk assembly is high, and the average track density of the selected track density profile is greater than the average track density of the nominal track density profile.

17. The method of claim 15, wherein the position error signal of the head-disk assembly is high, the seek performance of head-disk assembly is high, and the average track density of the selected track density profile is less than the average track density of the nominal track density profile.

18. The method of claim 15, wherein the position error signal of the head-disk assembly is low, the seek performance of head-disk assembly is low, and the average track density of the selected track density profile is greater than the average track density of the nominal track density profile.

19. A servo-track writer for writing a plurality of calibration tracks on a storage medium of a head-disk assembly at a calibration stepping increment and for writing a plurality of servo-tracks on the storage medium of the head-disk assembly at a selected stepping increment, the head-disk assembly comprising a read element, a write element, and an actuator, the head-disk assembly having a servo performance, the servo-track writer comprising:

(a) a controller that processes a clock reference pattern to determine the circumferential location of the write element and that directs the write element to write the servo-tracks to the storage medium;

(b) a servo performance measurement circuit that measures an aspect of the servo performance of the head-disk assembly and that selects a stepping increment based thereon; and (c) a head positioner circuit that comprises a positioning mechanism that imparts a step-wise movement to the actuator at a calibration stepping increment for writing the plurality of calibration tracks, and that imparts a step-wise movement to the actuator at the selected stepping increment for writing the plurality of servo-tracks to the storage medium.

20. The servo-track writer of claim 19, wherein the selected stepping increment is greater than the calibration stepping increment.

21. The servo-track writer of claim 19, wherein the selected stepping increment is less than the calibration stepping increment.

22. The servo-track writer of claim 19, wherein the servo performance measurement circuit is capable of measuring the position error signal of the head-disk assembly at the calibration tracks.

23. The servo-track writer of claim 19, wherein the servo performance measurement circuit is capable of measuring the settle time of the head-disk assembly.

24. The servo-track writer of claim 23, wherein servo performance measurement circuit is capable of measuring the position error signal of the head-disk assembly at the calibration tracks.

25. A disk drive comprising:

a head-disk assembly having a servo performance, the head disk assembly comprising:

an actuator;

a read element;

a write element;

a spindle motor; and a disk having a storage medium, the disk mounted on the spindle motor, the storage medium written by:

writing a plurality of calibration tracks onto the storage medium at a calibration track density corresponding to a portion of a nominal track density profile;

measuring the servo performance of the head-disk assembly at the calibration tracks;

selecting a track density profile based on the measured servo performance of the head-disk assembly; and writing a plurality of servo-tracks to storage medium of the disk at the selected track density profile.

26. The disk drive of claim 25, wherein the average track density of the selected track density profile is greater than the average track density of the nominal track density profile.

27. The disk drive of claim 25, wherein the average track density of the selected track density profile is less than the average track density of the nominal track density profile.

28. The disk drive of claim 25, wherein the step of measuring the servo performance of the head-disk assembly further comprises measuring the position error signal of the head-disk assembly at the calibration tracks.

29. The disk drive of claim 25, wherein the step of measuring the servo performance of the head-disk assembly further comprises measuring the settle time of the head-disk assembly.

30. The disk drive of claim 29, wherein the step of measuring the servo performance of the head-disk assembly further comprises measuring the position error signal of the head-disk assembly at the calibration tracks.

31. A disk drive comprising:

a head-disk assembly having a servo performance, the head disk assembly comprising:

an actuator;

a read element;

a write element;

a spindle motor; and a disk having a storage medium, the disk mounted on the spindle motor, the storage medium written by:

writing a plurality of calibration tracks onto the storage medium at a calibration track density corresponding to a portion of a nominal track density profile;

measuring the position error signal and the settle time of the head-disk assembly at the calibration tracks;

identifying a density-based track density profile based on the measured position error signal of the head-disk assembly;

determining whether the value of the measured position error signal permits reducing the average density of the density-based track density profile in order to improve the settle time of the head-disk assembly;

selecting a track density profile based on the determining step; and writing a plurality of servo-tracks to the storage medium of the disk at the selected track density profile.

32. The disk drive of claim 31, wherein the measured position error signal of the head-disk assembly is low, the measured seek performance of head-disk assembly is high, and the average track density of the selected track density profile is greater than the average track density of the nominal track density profile.

33. The disk drive of claim 31, wherein the position error signal of the head-disk assembly is high, the seek performance of head-disk assembly is high, and the average track density of the selected track density profile is less than the average track density of the nominal track density profile.

34. The disk drive of claim 31, wherein the position error signal of the head-disk assembly is low, the seek performance of head-disk assembly is low, and the average track density of the selected track density profile is greater than the average track density of the nominal track density profile.

* * * * *